United States Patent Office 3,817,843
Patented June 18, 1974

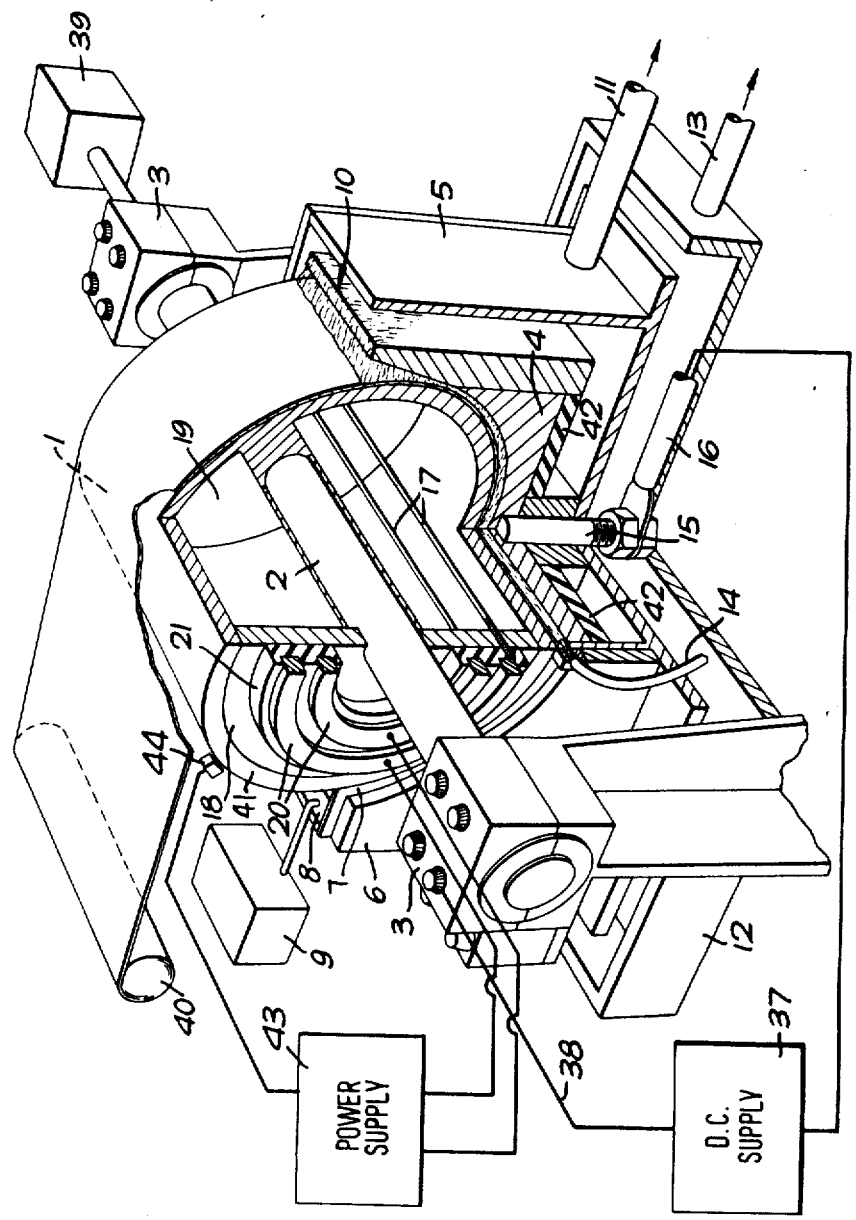

3,817,843
ELECTRODEPOSITION OF IRON FOIL
Frederick Barrett, Heswall, England, assignor to The Electricity Council, London, England
Filed Apr. 12, 1972, Ser. No. 243,390
Claims priority, application Great Britain, Apr. 13, 1971, 9,236/71
Int. Cl. C23b 7/02, 7/04
U.S. Cl. 204—13                                       3 Claims

ABSTRACT OF THE DISCLOSURE

An improved method of making iron foil by electrodeposition on a drum cathode, in which the cathode is internally heated. Also, a method of making iron foil which, as stripped from the cathode, has an acceptable Jenkin's Bend value. An apparatus for carrying out the above methods is described and includes a drum cathode with a titanium cathode surface uniformly spaced from a carbon anode; electrolyte flows between the cathode and anode under substantially streamline conditions so as to keep the anolyte and catholyte separated; heaters are mounted inside the cathode and P.T.F.E. sealing strips bearing on the edge portions of the cathode surface enable the stripped iron foil to have acceptable edges not requiring a trimming operation.

BACKGROUND OF THE INVENTION

This invention relates to the electrodeposition of iron foil or strip, hereinafter referred to as iron foil.

It is known, e.g. from British Patent Specification No. 1,251,650, to produce iron foil on a moving cathode by electrolysis of an electrolyte and to strip the foil from the cathode. The temperature of the electrolyte becomes raised due to the effect of the electrolysing current, and the electrolyte may be intentionally heated to increase its conductivity, and to improve the ductility of the deposited foil.

In an apparatus for carrying out such a method the stripping point is above the electrolyte level and heat loss from the cathode region not in contact with hot electrolyte may result in a non-uniform cathode temperature and consequently the deposited foil may have non-uniform characteristics.

SUMMARY

This invention therefore provides a method of making iron foil by electrodeposition of iron on a cathode, comprising electrolysing an electrolyte and stripping deposited foil from the cathode, the electrolyte being made to flow at a uniform rate between the cathode and an anode, the cathode surface being continuously moved through the electrolyte at a uniform rate, the anode being uniformly spaced from the cathode and being of non-consumable material; the method including the step of heating the cathode to a substantially uniform temperature.

Preferably the cathode surface is formed of titanium. This permits the use of an electrolyte having a low value of pH, which is one of the key features of a method of producing iron foil having an acceptable Jenkin's Bend value, and therefore not requiring subsequent heat treatment. Heretofore iron foil produced by electrodeposition, as for example in the aforementioned specification, has required heat treatment in order to produce an acceptable J.B. value. As will be apparent from the following specification, by the present application it is possible to produce a foil which, as stripped from the cathode and without heat treatment, has an acceptable J.B. value.

Hence this invention further provides a method of making iron foil by electrodeposition of iron on a cathode, comprising electrolysing a ferrous chloride solution having a molarity lying between 2.4 and 3.5, a pH lying between 0.3 and 1.4, and a temperature lying between 92° C. and 105° C., the electrolyte being made to flow between the cathode and an anode at a velocity lying between 2 cm./sec. and 10 cm./sec., the cathode having a titanium surface which is continuously moved through the electrolyte at a uniform rate, the anode being uniformly spaced from the cathode and being of nonconsumable material, the cathode temperature being not lower than that of the electrolyte and lying between 92° C. and 110° C., the anode being at a temperature lying between 50° C. and 105° C., the electrolysing current density at the cathode lying between 0.2 a./cm.$^2$ and 1.0 a./cm.$^2$, and stripping the deposited foil from the cathode.

Foil produced under these conditions has a J.B. value typically in the range 15 to 20.

The molarity of the electrolyte is high to avoid the formation of dendrites in the deposited foil, and to avoid a high plating potential. With a low pH to electrolyte is more conductive, the cathode efficiency is high (i.e. production of $H_2$ at the cathode is low), ferric salts are prevented from precipitating out of solution, and the deposited foil tends to be more ductile.

In prior methods it has been necessary to use diaphragms, etc., to avoid mixing of anolyte and cathode. With the present method the electrolyte flow rate enables substantially laminar flow to be obtained, thus maintaining the required separation without the use of a diaphragm.

Foil tends to be more ductile at high electrolyte temperatures and the electrical conductivity of the electrolyte is improved. A consistent size of crystal structure in the foil can be maintained by controlling the electrolysing current density in dependence upon the electrolyte temperature, in other words if the electrolyte temperature is raised, then the current density must also be increased to maintain the same foil characteristics. Although it is possible to produce foil at electrolyte temperatures below 92° C., the corresponding current density then becomes too low to be likely to be of commercial interest.

Preferably the cathode temperature is kept higher than the electrolyte temperature as the deposited foil then tends to be more ductile. The anode temperature is prevented from becoming so low as to chill the electrolyte and precipitate the dissolved salts.

The electrolysing current density must be high enough to achieve a reasonable rate of production of foil, yet not so high as to cause the foil to have a J.B. value which is too low, and which would necessitate heat treatment of the foil.

This invention further provides an electrodeposition cell for carrying out a method of making iron foil including the step of heating the cathode to a substantially uniform temperature, the cell comprising a cathode having its surface uniformly spaced from an anode formed of non-consumable material, means for maintaining a uniform rate of flow of electrolyte between the cathode and the anode, means for moving the cathode surface continuously through the electrolyte at a uniform rate, means for maintaining the cathode at a predetermined temperature, and means for stripping the deposited foil from the cathode.

Preferably the cathode surface is formed of titanium.

For carrying out the aforementioned method of producing foil not requiring a heat treatment, the cell preferably includes means for maintaining the electrolyte at a predetermined temperature, means for maintaining the electrolysing current at a predetermined density at the cathode, and means for maintaining the anode at a predetermined temperature.

The cell may have means engaging the cathode surface so as to delineate the width of iron foil deposited on the cathode. By this means it is possible to confine the deposition of foil so that trimming of the foil edges after stripping is unnecessary.

The cathode may be cylindrical and comprise a titanium sleeve mounted on a support formed of a plurality of spaced-apart coaxial discs. The initial cost of a cathode can be reduced thereby, replacement of the sleeve is both facilitated and results in a lower cost than replacement of a complete cathode, and it is preferable to use a support having known or good electrical conductivity.

DESCRIPTION OF THE DRAWING

The drawing shows a part schematic/part cut-away view of a cell having a cylindrical cathode.

DETAILED DESCRIPTION

In the drawing a cylindrical cathode 1 comprising a titanium sleeve 41 mounted on end plates 18, 19 is mounted on an electrically conducting shaft 2. The shaft 2 is mounted in trunnions 3 which are designed to provide the necessary electrical connection between a D.C. supply 37 and the shaft 2. The power supply 37 is arranged to maintain the electrolysing current at a predetermined value. Situated underneath the cathode is a carbon anode 4, having a curved surface concentric with and uniformly spaced from the surface of cathode 1. The spacing is made small, about 1.0 cm., to keep the resistance of the cell low, and the angle subtended by arcuate surface of the anode is approximately 160°.

An assembly box 5 with side cheeks 6 surrounds the anode and cathode. The side cheeks have an arcuate cutout concentric with the cathode and of about the same radius as the arcuate surface of the anode 4. Pieces of flexible material (polytetrafluoroethylene) are situated inside each cheek 6, bearing on the edge portions of the cathode surface to form rubbing seals 7. These seals restrict deposition of the foil to a width just less than that of the cathode surface. By preventing the foil from being deposited at and around the cathode edge, the edges of the stripped foil do not require to be trimmed.

At one side of the assembly box is a header tank 8 to which an electrolyte (ferrous chloride solution) is fed having been first prepared and held at normal operating temperature in a temperature controlled tank 9. At the opposite side of the anode to the header tank is a weir 10 which is adjustable in height such that the flow of electrolyte between anode and cathode can be altered. The anolyte and catholyte flows are substantially separated by streamline flow and centrifugal force. The spill from the weir is taken via pipe 11 back to the tank 9 and any leakage past the rubbing seals 7 is caught in a catch tray 12 and taken back to tank 9 via pipe 13. A drain pipe 14 is provided so that the electrolyte can be emptied from between the anode and cathode.

The cathode is connected to the D.C. power supply via a cable 38 connected to the trunnion mounts, and the anode is connected to the power supply by means of a stud 15 and a cable 16.

Insulation 42 is provided under the anode 4 to prevent the anode temperature from becoming so low as to chill the electrolyte.

A number of heaters 17 are mounted between end plates 18, 19 of the cathode. The heaters are connected via slip ring 20 to a power supply 43 which, to maintain a predetermined cathode temperature, regulates the supply of power to the heaters in dependence on the output of temperature sensor 44 in contact with the cathode surface. The slip rings are mounted on an insulating annulus 21 attached to end plates 18.

Protective covers (not shown) are fitted over the header tank and the weir to minimise vapour loss from the electrolyte.

The cathode is slowly rotated by a motor 39 and the metal foil is stripped from the cathode continuously and wound onto reel 40.

A process operated under the conditions of the following examples produces material suitable for particular purposes, according to customer requirement.

EXAMPLE 1

(a) the molarity of the ferrous chloride electrolyte maintained at between 3.1 and 3.0;
(b) the pH of the ferrous chloride maintained at between 1.2 annd 0.8;
(c) the temperature of the ferrous chloride maintained at 97° C.;
(d) the velocity of the ferrous chloride maintained at 4 cm./sec.;
(e) the cathode temperature maintained at 98° C.;
(f) the anode temperature maintained at 70° C.; and
(g) the cathode current density maintained at 0.6 a./cm.$^2$.

EXAMPLE 2

(a) the molarity of the ferrous chloride maintained at between 3.3 and 3.1;
(b) the pH of the ferrous chloride maintained at between 1.1 and 0.6;
(c) the temperature of the ferrous chloride maintained at 101° C.;
(d) the velocity of the ferrous chloride maintained at 8 cm./sec.;
(e) the cathode temperature maintained at 108° C.;
(f) the anode temperature maintained at 65° C.; and
(g) the cathode current density maintained at 0.5 a./cm.$^2$.

EXAMPLE 3

(a) the molarity of the ferrous chloride maintained at between 2.9 and 2.6;
(b) the pH of the ferrous chloride maintained at between 0.8 and 0.4;
(c) the temperature of the ferrous chloride maintained at 98° C.;
(d) the velocity of the ferrous chloride maintained at 3 cm./sec.;
(e) the cathode temperature maintained at 98° C.;
(f) the anode temperature maintained at 85° C.; and
(g) the cathode current density maintained at 0.25 a./cm.$^2$.

An advantage afforded by a method of producing iron foil which, as stripped from the cathode has an acceptable J.B. value, is that the foil surface can immediately be upgraded with any suitable treatment, for example, lacquering, or electroplating with say zinc, copper, nickel or tin, before the surface of the foil begins to oxidise to a significant extent.

I claim:

1. A method of making iron foil by electrodeposition of iron on a moving cathode, comprising providing a drum cathode having its cylindrical surface formed of titanium, arranging the cathode for rotation about a horizontal axis, providing a carbon anode having its operative surface uniformly spaced from the cylindrical surface of the cathode and extending around a portion thereof thereby forming an arcuate gap, providing a laminar flow of ferrous chloride electrolyte around the arcuate gap between the anode and the cathode, connecting the anode and cathode to a source of electrical current thereby electrodepositing iron on the cathode, rotating the cathode at a uniform rate, and stripping the deposited foil from the cathode, the ferrous chloride electrolyte having a molarity lying between 2.4 and 3.5, a pH lying between 0.3 and 1.4, and a temperature lying between 92° C. and 105° C., and being made to flow between the anode and the cathode at a velocity lying between 2 cm./sec. and 10 cm./sec., the cathode being heated by use of heating means such that the temperature of the titanium surface is not lower than that of the electrolyte and lies between 92° C. and 110° C., the anode being at a temperature lying between 50° C. and 105° C., and the electrolyzing current density at the cathode lying between 0.2 a./cm.$^2$ and 1.0 a./cm.$^2$.

2. A method as claimed in claim 1 wherein the cathode temperature is higher than that of the electrolyte.

3. A method as claimed in claim 1 and including providing means engaging the cathode surface so as to delineate the width of iron foil deposited on the cathode.

References Cited

UNITED STATES PATENTS

| 3,461,046 | 8/1969 | Clancy | 204—216 |
| 3,151,048 | 9/1964 | Conley et al. | 204—208 |
| 2,515,614 | 7/1950 | Schumacher | 204—274 |
| 2,028,285 | 1/1936 | Jephson et al. | 204—274 |

THOMAS M. TUFARIELLO, Primary Examiner

U.S. Cl. X.R.

204—208, 216